(12) United States Patent
Yamada et al.

(10) Patent No.: US 6,338,826 B2
(45) Date of Patent: Jan. 15, 2002

(54) GAS DUCT HAVING HONEYCOMB STRUCTURE

(75) Inventors: Toshio Yamada; Toshihiko Hijikata; Yukiharu Morita, all of Nagoya (JP)

(73) Assignee: NGK Insulators, Ltd. (JP)

( * ) Notice: Subject to any disclaimer, the term of this patent is extended or adjusted under 35 U.S.C. 154(b) by 0 days.

(21) Appl. No.: 09/337,334

(22) Filed: Jun. 21, 1999

(30) Foreign Application Priority Data

Jul. 23, 1998 (JP) .......................... 10-208016

(51) Int. Cl.$^7$ .......................... F01N 3/28; B01D 53/34; B01D 53/88
(52) U.S. Cl. .......................... 422/180; 422/171; 422/177; 422/179; 422/173
(58) Field of Search .......................... 422/171, 177, 422/179, 180, 173; 60/299

(56) References Cited

U.S. PATENT DOCUMENTS 3,801,289 A    4/1974  Wiley .......................... 422/180
5,693,295 A  * 12/1997 Foster .......................... 422/180
5,866,079 A  *  2/1999 Machida et al. ............. 422/179

FOREIGN PATENT DOCUMENTS

| DE | 2 324 866    | 11/1973 |
|----|--------------|---------|
| DE | 35 06 219 A1 | 9/1986  |
| JP | 2-126016     | 10/1990 |
| JP | 7-77036      | 3/1995  |

\* cited by examiner

*Primary Examiner*—Hien Tran
(74) *Attorney, Agent, or Firm*—Parkhurst & Wendel, L.L.P.

(57) ABSTRACT

A gas duct having a honeycomb structure includes: a metal case, a honeycomb structure accommodated in the metal case, a holding member placed between the outer surface of the honeycomb structure and the inner surface of the metal case, and a cone fitted to the inner surface of the metal case at one or both openings of the metal case, wherein the circumference of one or both end faces of the honeycomb structure is allowed to abut on the cone. The gas duct having a honeycomb structure can effectively utilize the whole volume of the honeycomb structure, is low in pressure loss, and inexpensive.

12 Claims, 5 Drawing Sheets

PRIOR ART

GAS DUCT HAVING HONEYCOMB STRUCTURE

BACKGROUND OF THE INVENTION (1) Field of the Invention

The present invention relates to a gas duct having a honeycomb structure, used mainly in an automobile exhaust gas purification system.

(2) Description of Related Art

Currently, gas ducts with honeycomb structure are in extensive use because they have low pressure loss (when a gas is passed therethrough) owing to their high open frontal area, and the structures show an excellent exhaust gas purifiability. As an example of such gas ducts, a widely known ceramic honeycomb catalytic converters are used in exhaust gas purification systems for automobiles.

To produce such a ceramic honeycomb catalytic converter, a ceramic honeycomb catalyst is held in a converter casing (this operation is called "canning") for easy handling of the honeycomb catalyst.

For example, as shown in FIGS. 4(a) and 4(b), in order to reliably hold a honeycomb catalyst 12 in a metal case 11 and further lessen the impact applied to the catalyst 12 from outside, a ceramic fiber mat 13 is inserted, under pressure, between the outer surface of the honeycomb catalyst 12 and the inner surface of the metal case 11, after which the honeycomb catalyst 12 is held in the metal case 11 in the axial direction of the metal case 11. Specifically, a hook 14, which is fitted to one end of the metal case 11 and projects toward the center of a circle formed by the one end of the metal case 11, and a retainer ring 15 welded to the other end of the metal case 11 or a plurality of projections 16 (see FIGS. 5(a) and 5(b)) extending from the other end of the metal case 11, but bent towards the center of a circle formed by the other end of the metal case 11, are allowed to abut on the honeycomb catalyst 12; then, each one cone (not shown), which is a metal member enabling easier incoming and discharging of exhaust gas, is fitted to the both ends of the metal case 11 by welding, or the like.

When the honeycomb catalyst 12 is held in the metal case 11 as above, however, the hook 14 and the retainer ring 15 both fitted to the metal case 11 block part of the passages of the honeycomb catalyst 12, which makes impossible the effective utilization of the whole volume of the honeycomb catalyst 12, and moreover incurs an increase in pressure loss. This leads to an increase in emission or a reduction in engine performance when the metal case 11 holding the honeycomb catalyst 12 is used as a honeycomb catalytic converter.

Further, since the hook 14 and the retainer ring 15 are fitted to the metal case 11, there arises an increase in processing cost and material cost of honeycomb catalytic converter.

SUMMARY OF THE INVENTION

In order to alleviate the above-mentioned problems of the related art, the present invention aims at providing a gas duct having a honeycomb structure, which utilizes the whole volume of the honeycomb structure, which is lower in pressure loss, and which is lower in cost.

According to the present invention, there is provided a gas duct having a honeycomb structure, which comprises:

a metal case, a honeycomb structure accommodated in the metal case, a holding member placed between the outer surface of the honeycomb structure and the inner surface of the metal case, and a cone(s) fitted to the inner surface of the metal case at one or both openings of the metal case, wherein the circumference(s) of one or both end faces of the honeycomb structure is (are) allowed to abut on the cone(s).

In the gas duct comprising a honeycomb structure, of the present invention, it is preferable that the circumference(s) of the end face(s) of the honeycomb structure abuts (abut) on the cone(s) at an angle of 45° to 85°.

In the gas duct having a honeycomb structure, of the present invention, it is also preferable that the circumference (s) of the end face(s) of the honeycomb structure is (are) chamfered and the size or radius of chamfering is 0.1 to 1 mm.

The gas duct having a honeycomb structure, of the present invention preferably takes the following form:

the honeycomb structure is made of a ceramic or a metal, and is a catalyst for exhaust gas purification, a filter for capturing the particulate substances present in exhaust gas, or a heat exchanger;

the holding member is a ceramic fiber mat or a metal-made wire mesh; and the metal case has a stuffing structure, a tourniquet structure, or a clam-shell structure.

BRIEF DESCRIPTION OF THE DRAWINGS

FIG. 5(a) is a perspective view, and FIG. 5(b) is a fragmentary sectional view.

DETAILED DESCRIPTION OF PREFERRED EMBODIMENTS

The present invention is hereinafter described in detail with reference to the accompanying drawings.

Figure 1:
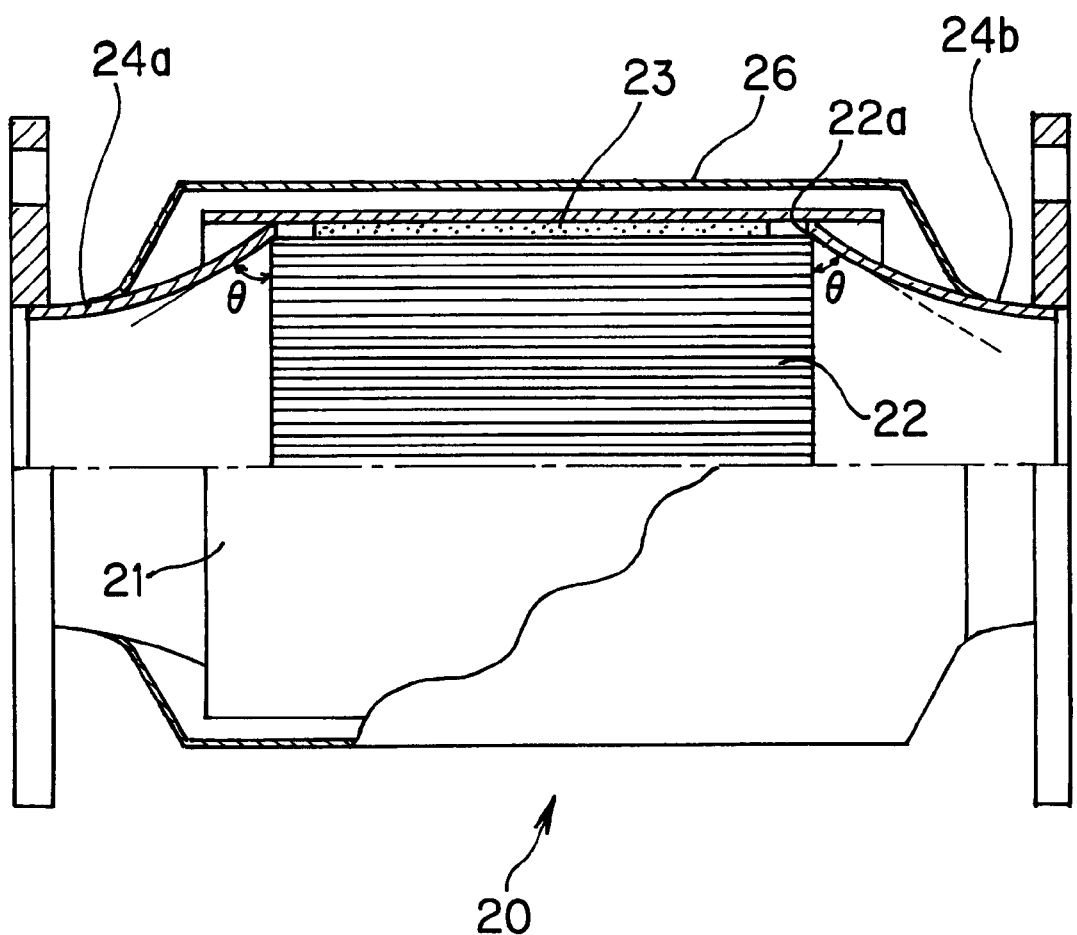
FIG. 1 is a drawing showing an example of the gas duct having a honeycomb structure, of the present invention.

FIG. 1 is a drawing showing an example of the gas duct 20 having a honeycomb structure, of the present invention.

The gas duct 20 having a honeycomb structure, shown in FIG. 1 comprises a metal case 21; a honeycomb structure 22 accommodated in the metal case 21; a holding member 23 placed between the outer surface of the honeycomb structure 22 and the inner surface of the metal case 21; cones 24 fitted to the inner surface of the metal case 21 at both openings of the metal case 21; and a cover 26 for heat insulation provided so as to cover the metal case 21.

Figure 2:
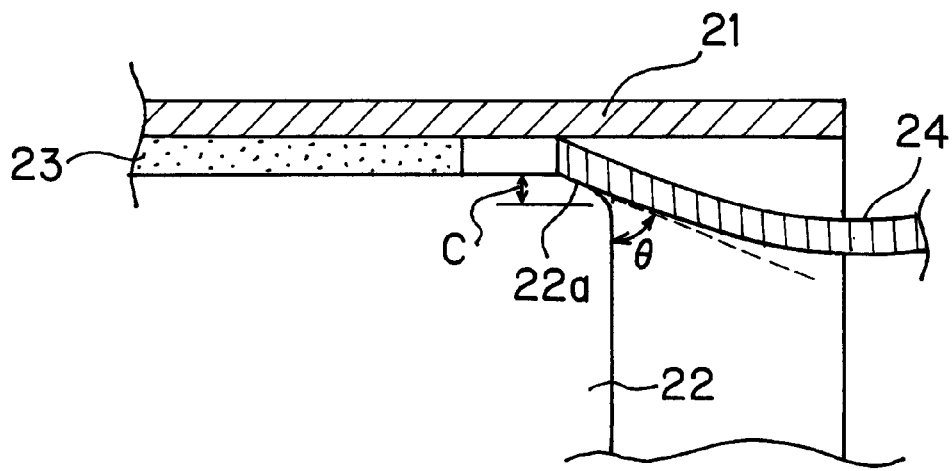
FIG. 2 is a fragmentary sectional view showing an example of the state in which, in the gas duct having a honeycomb structure, of the present invention, the circumference of one end face of the honeycomb structure abuts on the cone.
Figure 3:
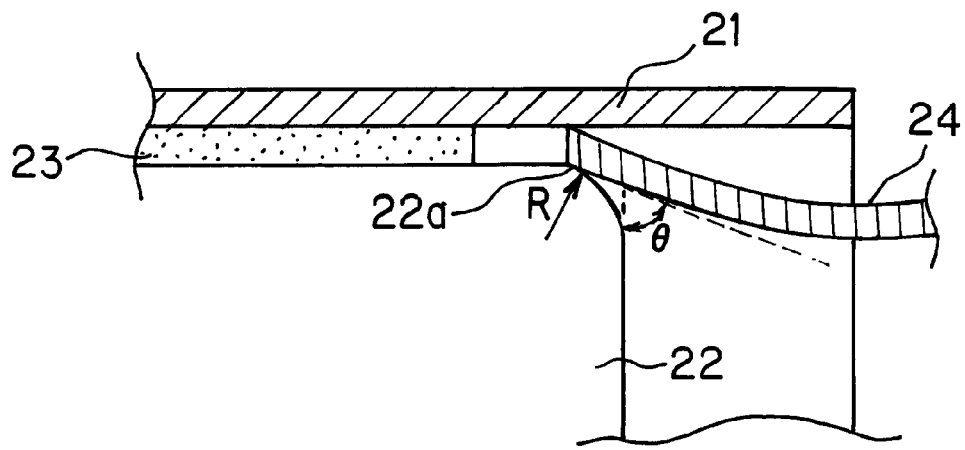
FIG. 3 is a fragmentary sectional view showing other example of the state in which, in the gas duct having a honeycomb structure, of the present invention, the circumference of one end face of the honeycomb structure abuts on the cone.

The main feature of the present gas duct 20 having a honeycomb structure lies in that the circumference 22a of at least one end face of the honeycomb structure 22 abuts on the cone 24 (see FIGS. 1 to 3).

Thereby, the honeycomb structure 22 can be pinched directly by the cone 24 [and not by a hook 14, a retainer ring 15 and a plurality of projections 16 (shown in prior art FIGS. 4(a) and 4(b), and 5(a) and 5(b)) all used conventionally]; as a result, none of the passages of the honeycomb structure 22 are blocked and the whole volume of the honeycomb structure 22 can be effectively utilized, and pressure loss and cost reduced.

Also in the present gas duct 20, the same performance can be obtained with a honeycomb structure smaller than conventional honeycomb structures, providing a cost benefit.

Further in the present gas duct 20, displacement of honeycomb structure 22 caused by vibration (this displacement is believed to take place mainly as a result of the shear deformation of holding member 23) can be prevented; moreover, contact of holding member 23 with high-temperature exhaust gas can be prevented, making it possible to suppress the deterioration of holding member 23.

In the present gas duct 20 having a honeycomb structure, it is preferable that the circumference(s) of the end face(s) of the honeycomb structure 22 abuts (abut) on the cone(s) 24 at an angle θ of 45° to 85°.

The reason therefor is as follows. That is, when the angle of abutting is less than 45°, the effect of pressure loss reduction is small; when the angle of abutting is more than 85°, the power of holding the honeycomb structure in the axial direction of the metal case is low.

Further in the present gas duct 20 having a honeycomb structure, it is preferable that the circumference(s) of the end face(s) of the honeycomb structure is (are) chamfered as shown in FIGS. 2 and 3.

The reason therefor is as follows. That is, by chamfering the circumference 22a of the end face of the honeycomb structure 22, the chipping of the honeycomb structure 22 occurring when the cone 24 is allowed to abut thereon, can be prevented.

It is also preferable that the size C (see FIG. 2) or radius R (see FIG. 3) of chamfering of the circumference 22a of the end face of the honeycomb structure 22 is 0.1 to 1 mm.

The reason therefor is as follows. That is, when the size C or radius R of chamfering is smaller than 0.1 mm, no sufficient effect is obtained; when the size C or radius R of chamfering is larger than 1 mm, a higher processing cost is incurred.

The holding member 23 used in the present gas duct is preferably a ceramic fiber mat or a metal-made wire mesh.

The honeycomb structure 22 used in the present gas duct is preferably made of a ceramic or a metal.

The honeycomb structure used in the present gas duct has a large number of passages having a polygonal section, which are parallel to the direction of the gas duct and which are surrounded by the partition walls formed inside the circumferential wall of the honeycomb structure, and is used as a catalyst for exhaust gas purification, as a filter for capturing the particulate substances present in exhaust gas, or as a heat exchanger.

The above-mentioned polygonal section of the passages of the honeycomb structure is preferably triangular to expect a pressure loss as low as possible.

The honeycomb structure has no particular restriction as to its shape; however, the shape of the section perpendicular to the direction of the present gas duct is ordinarily round, oval, race-track or the like.

The metal case 21 used in the present gas duct, preferably has a stuffing structure, a tourniquet structure, or a clam-shell structure.

The above structure of the metal case 21 is appropriately selected depending upon the shape of the honeycomb structure 22. For example, the stuffing structure and the tourniquet structure are suitable for a round-shaped honeycomb structure because these metal case structures enable relatively easy canning. The clam-shell structure of metal case is suitable for an oval or race-track honeycomb structure because it enables relatively easy canning.

The present invention is described in more detail below by way of Examples. However, the present invention is in no way restricted to these Examples.

EXAMPLES 1 TO 3 AND COMPARATIVE EXAMPLES 1 TO 4

As shown in FIG. 1, one end of a cone 24a was completely welded onto the inner surface of a metal case 21 at one opening of the metal case 21; then, a honeycomb structure 22 was inserted into the metal case 21 from the other opening of the metal case 21; also from the other opening of the metal case 21 a holding member 23 was inserted, under pressure, into between the outer surface of the honeycomb structure 22 and the inner surface of the metal case 21; thereafter, a cone 24b was inserted into the metal case 21 at the other opening of the metal case 21, and welded onto the inner surface of the metal case 21 temporarily at 4 points in a state that the cone 24b was allowed to abut on the circumference 22a of one end face of the honeycomb structure 22 at an angle θ shown in Table 1; next, the cone 24b was completely welded; a cover 26 was welded at 8 points so as to cover the metal case 21; thereby, various gas ducts 20 comprising a honeycomb structure, of Examples 1 to 3 and Comparative Examples 1 to 2 were produced.

TABLE 1

|  | Angle of abutting θ (°) |
| --- | --- |
| Example 1 | 45 |
| Example 2 | 60 |
| Example 3 | 85 |
| Comparative Example 1 | 30 |
| Comparative Example 2 | 90 |
| Comparative Example 3 | — |
| Comparative Example 4 | — |

Figure 4A:
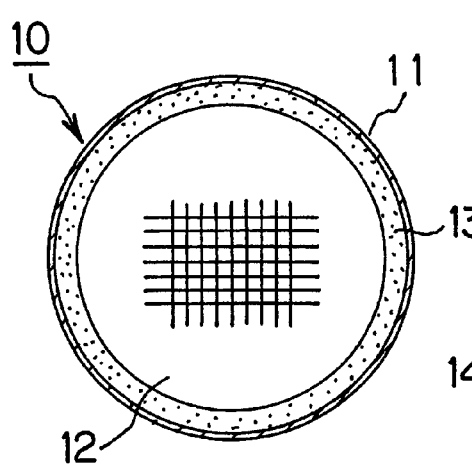
FIGS. 4(a) and 4(b) are drawings showing a prior art example of conventional gas ducts having a honeycomb structure, i.e. conventional ceramic honeycomb catalytic converters.
Figure 4B:
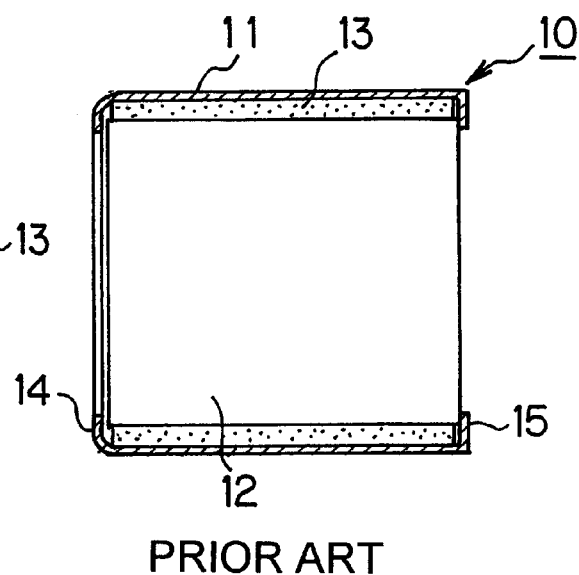
Figure 5A:
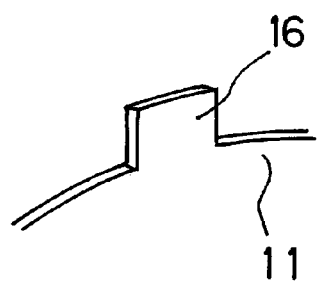
FIGS. 5(a) and 5(b) show an example of the state in which, in a prior art conventional gas duct having a honeycomb structure, the circumference of one end face of the honeycomb structure abuts on the projections of the metal case.
Figure 5B:
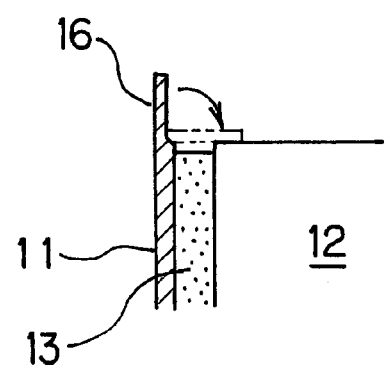

Separately, as shown in FIGS. 4(a) and 4(b), a honeycomb structure 12 was held in a metal case 11; a ceramic fiber mat 13 was inserted, under pressure, into between the outer surface of the honeycomb structure 12 and the inner surface of the metal case 11; in order to hold the honeycomb structure 12 in the metal case 11 in the axial direction of the metal case 11, a hook 14 projecting from one end of the metal case 11 toward the center of a circle formed by said one end and a retainer ring 15 welded to the other end of the metal case 11 were allowed to abut on the honeycomb structure 12; then, a cone (not shown), which was a metal member having a function of introducing and discharging an exhaust gas, was connected, by welding, to each end of the metal case 11; thereby, a gas duct having a honeycomb structure, of Comparative Example 3 was produced.

In Comparative Example 4, a gas duct having a honeycomb structure was produced in the same manner as in Comparative Example 3 except that neither hook 14 nor retainer ring 15 was used.

The thus-produced gas ducts having a honeycomb structure, of Examples 1 to 3 and Comparative Examples 1 to 4 were subjected to the following three kinds of tests.

Pressure Loss Test 1

Figure 6:
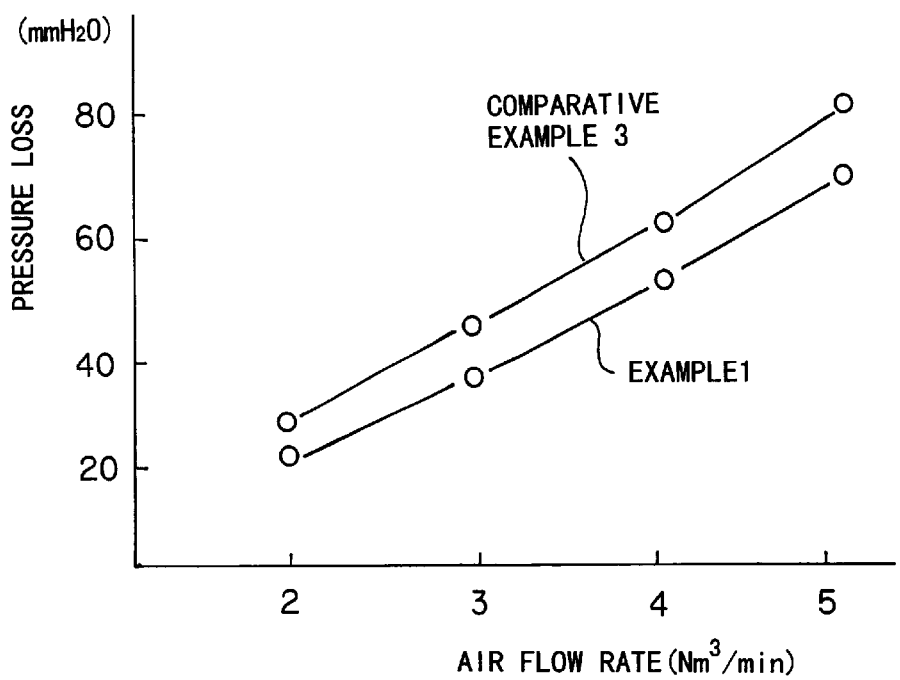
FIG. 6 is a graph showing the change of pressure loss when air flow rate was changed, in the gas duct having a honeycomb structure, of Example 1 or Comparative Example 3.

The gas ducts of Example 1 and Comparative Example 3 were measured for change of pressure loss at room temperature when air flow rate was changed. The results are shown in FIG. 6.

Pressure Loss Test 2

Figure 7:
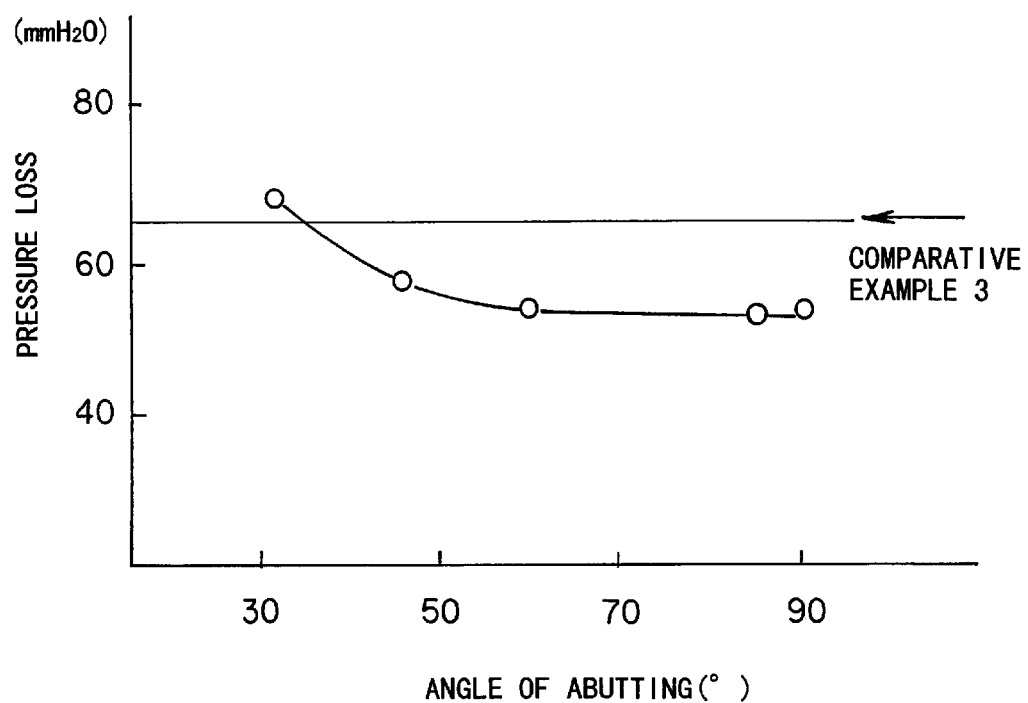
FIG. 7 is a graph showing, in a gas duct having a honeycomb structure, the change of pressure loss when the angle θ of abutting between the circumference of one end face of the honeycomb structure and the cone was changed in the range of 30 to 90°.

The gas ducts of Examples 1 to 3 and Comparative Examples 1 to 2 were measured for change of pressure loss at an air flow rate of 4 $Nm^3$/min when the angle θ of abutting between the circumference of one end face of the honeycomb structure and the cone was changed from 30 to 90°. The results are shown in FIG. 7.

Heating and Vibration Test

Figure 8:
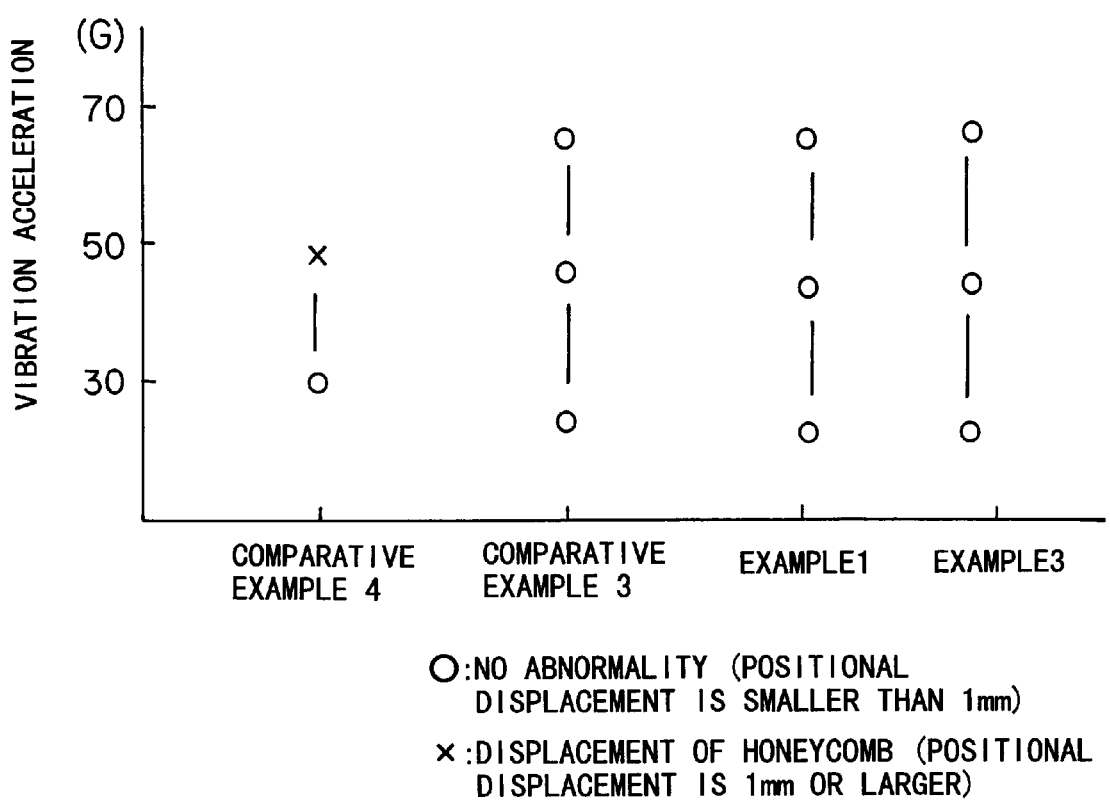
FIG. 8 is a graph showing the results of heating and vibration tests conducted for the gas ducts having a honeycomb structure, of Examples 1 and 3 and Comparative Examples 3 and 4.

The gas duct having a honeycomb structure, of Example 1 or 3 or Comparative Example 3 or 4 was fitted to a heating and vibration tester so that the direction of the gas duct became identical with the vibration direction of the tester; then, the gas duct was vibrated at a given vibration acceleration for 4 hours under the conditions of a low-high temperature cycle (gas temperature: 200 to 1,000° C.) and 185 Hz; and the amount of displacement of honeycomb structure in metal case was measured; thereby, the gas duct was evaluated for resistance to heating and vibration. The results are shown in FIG. 8.

Incidentally, the following materials were used in production of each gas duct comprising a honeycomb structure.

Honeycomb structure: size=103 mm (diameter)×120 mm length), rib thickness=0.1 mm, cell density=62 cells/cm2, made of cordierite Ceramic fiber mat: Maftec (brand name), a product of Mitsubishi Chemical Corporation Metal case: a stuffing structure made of SUH 409

Cone and retainer ring: both made of SUH 409

Evaluation of Test Results

As shown in FIG. 6, the gas duct of Example 1 maintained the same holding power for honeycomb structure as the gas duct of Comparative Example 3, in the axial direction of the metal case, and was lower in pressure loss than the latter gas duct by about 15%.

As shown in FIG. 7, when the angle θ of abutting between the circumference of one end face of the honeycomb structure and the cone was in the range of 45 to 85°, reduction in pressure loss was possible while the holding power for honeycomb structure in the axial direction of metal case was maintained.

As shown in FIG. 8, displacement of honeycomb structure appeared at a vibration acceleration of 50 G in the gas duct of Comparative Example 4 (using no retainer ring); however, the gas ducts of Examples 1 and 3 had about the same vibration resistance as the gas duct of Comparative Example 3 (using a retainer ring).

As described above, the gas duct having a honeycomb structure, of the present invention can effectively utilize the whole volume of the honeycomb structure, is low in pressure loss, and is low also in cost.

Further, the gas duct having a honeycomb structure, of the present invention can prevent the displacement of honeycomb structure caused by vibration; moreover, can prevent the contact of holding member with high-temperature exhaust gas and can therefore suppress the deterioration of holding member.

What is claimed is:

1. A honeycomb-containing structure, which comprises:

a metal case having an inner surface and at least two openings;

a honeycomb structure, having passages and two end faces, a circumference defined by the outer edge of each end face and an outer surface between the end faces, the honeycomb structure being located inside the metal case;

a holding member placed between the outer surface of the honeycomb structure and the inner surface of the metal case; and a cone fitted to the inner surface of the metal case at one or both openings of the metal case, wherein the outer surface at the circumference of one or both end faces of the honeycomb structure is rounded thereby presenting a rounded surface between the end face and the outer surface, the rounded surface abutting at least one cone, and wherein (1) basically none of the passages of the honeycomb structure are blocked and basically the whole volume of the honeycomb structure can be effectively used and (2) the radius of rounding of the circumference of the end face of the honeycomb structure is 0.1 to 1 mm.

2. A honeycomb-containing structure according to claim 1, wherein the circumference of the end face of the honeycomb structure abuts on the cone at an angle of 45 to 85°.

3. A honeycomb-containing structure according to claim 1, wherein the honeycomb structure is made of a ceramic.

4. A honeycomb-containing structure according to claim 1, wherein the honeycomb structure is made of a metal.

5. A honeycomb-containing structure according to claim 1, wherein the honeycomb structure is a honeycomb catalyst structure and is in an exhaust gas purification system, whereby the honeycomb catalyst structure catalyzes the purification of exhaust gas.

6. A honeycomb-containing structure according to claim 1, wherein the honeycomb structure is located in an exhaust gas system to capture particulate substances present in exhaust gas, thereby filtering the exhaust.

7. A honeycomb-containing structure according to claim 1, wherein the honeycomb structure is located in a heat exchange system.

8. A honeycomb-containing structure according to claim 1, wherein the holding member is a ceramic fiber mat.

9. A honeycomb-containing structure according to claim 1, wherein the holding member is a metal-made wire mesh.

10. A honeycomb-containing structure according to claim 1, wherein the metal case has a stuffing structure.

11. A honeycomb-containing structure according to claim 1, wherein the metal case has a tourniquet structure.

12. A honeycomb-containing structure according to claim 1, wherein the metal case has a clam-shell structure.

* * * * *